(12) United States Patent
Tamura et al.

(10) Patent No.: US 7,155,200 B2
(45) Date of Patent: Dec. 26, 2006

(54) RADIO APPARATUS AND LINK LOSS RECOVERY METHOD

(75) Inventors: Toshiya Tamura, Kokubunji (JP); Kentaro Nagahama, Kodaira (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 148 days.

(21) Appl. No.: 10/946,534

(22) Filed: Sep. 20, 2004

(65) Prior Publication Data

US 2005/0208932 A1   Sep. 22, 2005

(30) Foreign Application Priority Data

Mar. 22, 2004   (JP) ............................. 2004-083583

(51) Int. Cl.
  *H04Q 7/20* (2006.01)
(52) U.S. Cl. .................. 455/403; 455/414.1; 455/345; 455/428
(58) Field of Classification Search ................ 455/436, 455/433, 435.1, 439, 404.2, 428, 41.2, 41.3, 455/403, 414.1, 414.3, 39, 230, 231, 344, 455/345
See application file for complete search history.

(56) References Cited

U.S. PATENT DOCUMENTS

| 5,924,042 | A * | 7/1999 | Sakamoto et al. ........... 455/458 |
| 6,445,918 | B1 * | 9/2002 | Hellander ................... 455/423 |
| 2002/0086671 | A1 * | 7/2002 | Amin et al. ................. 455/432 |
| 2005/0202849 | A1 * | 9/2005 | Ignatin ....................... 455/564 |

FOREIGN PATENT DOCUMENTS

| JP | 6-303184 | 10/1994 |
| JP | 2002-12091 A | 1/2002 |
| JP | 2002-185450 A | 6/2002 |
| JP | 2003-92775 A | 3/2003 |
| JP | 2003-92784 A | 3/2003 |
| JP | 2003-125461 A | 4/2003 |
| WO | WO 97/33387 A1 | 9/1997 |

OTHER PUBLICATIONS

"Bluetooth Hands-Free Profile Application Guideline" Ver1.0, Jun. 20, 2003, CCAP (Car—Communication—Application—Promotion).
"Bluetooth Hands-Free Profile Application Guideline, Appendix A" Ver1.0, Jun. 20, 2003, CCAP (Car—Communication—Application—Promotion).
"MCPC TR-OOx Ver.1.0 Hands Free Profile Technical Reference" Ver.1.0, Dec. 25, 2003, Mobile Computing Promotion Consortium (MCPC) (Japanese and English translation).

* cited by examiner

*Primary Examiner*—CongVan Tran
(74) *Attorney, Agent, or Firm*—Frishauf, Holtz, Goodman & Chick, P.C.

(57) ABSTRACT

A radio apparatus which conducts radio communication by establishing a communication link with a given device includes a first store unit configured to store first identifying information which identifies the given device with which the communication link has been established, a receive unit configured to receive a connection request from another device when the communication link is disconnected; a obtain unit configured to obtain second identifying information which identifies the another device from the another device from which the connection request is received, a determine unit configured to determine whether the first identifying information agrees with the second identifying information, a establish unit configured to establish a communication link with the another device from which the connection request has been received, if it is determined that the first identifying information agrees with the second identifying information.

6 Claims, 3 Drawing Sheets

RADIO APPARATUS AND LINK LOSS RECOVERY METHOD

CROSS-REFERENCE TO RELATED APPLICATIONS

This application is based upon and claims the benefit of priority from prior Japanese Patent Application No. 2004-083583, filed Mar. 22, 2004, the entire contents of which are incorporated herein by reference.

BACKGROUND OF THE INVENTION

1. Field of the Invention

This invention relates to a radio apparatus which provides services to other devices through radio communications, and a link loss recovery method in radio communications with other devices.

2. Description of the Related Art

A cellular phone (radio apparatus) which can perform short-range radio communications using a Bluetooth technique operates as a server, and can provide various services to other devices (devices such as car equipments and personal computers) with a radio communication unit. For example, a cellular phone can provide a handsfree service. The user using the device provided with the handsfree service from the cellular phone can talk with the other party connected via a communication network by the cellular phone, by using a microphone or a speaker for telephone conversation provided on the device.

Such a cellular phone performs reconnection with the device when a communication link with the device is disconnected (link loss). For example, "MCPC TR-00x Ver.1.0 HANDSFREE PROFILE Technical Reference" Ver.1.0, Dec. 25, 2003, p. 15 discloses, as a recommended matter for service level connection, that the car equipment performs reconnection of the service level connection when a link loss occurs in the service level connection between the cellular phone and the car equipment.

Usually, to recover the link loss, it is necessary to render one of the cellular phone and the device a state of waiting a connection request (server state). When the device in the server state receives a connection request from another device, it establishes a communication link with the other device. Therefore, if the cellular phone becomes a connection request waiting state (server state) after a link loss, the cellular phone may receive a connection request from another device different from the device connected with the cellular phone before link loss. In such a case, if the cellular phone establishes a communication link with another device in response to a connection request, it is impossible to continue to provide the service to the device connected before the link loss.

BRIEF SUMMARY OF THE INVENTION

According to an embodiment of the present invention, a radio apparatus which conducts radio communication by establishing a communication link with a first device, the apparatus characterized by comprising: a first store unit configured to store first identifying information which identifies the first device with which the communication link has been established; a receive unit configured to receive a connection request from one of a plurality of devices including the first device when the communication link is disconnected; a obtain unit configured to obtain second identifying information, which identifies a second device, from the second device from which the connection request is received; a first determine unit configured to determine whether the first identifying information agrees with the second identifying information; and a first establish unit configured to establish a communication link with the second device from which the connection request has been received, if it is determined that the first identifying information agrees with the second identifying information.

According to the embodiment of present invention, the first identifying information which identifies the given device, with which a communication link has been established, is held. If the communication link is disconnected and a connection request from another device occurs, it is determined whether the second identifying information which identifies the another device agrees with the first identifying information. Then, if it is determined that they agree, a communication link with the another device is established. Therefore, after disconnection of a communication link, it is possible to recover the communication link by proper reconnection with the device which was connected before the disconnection.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be explained with reference to drawings.

Figure 1:
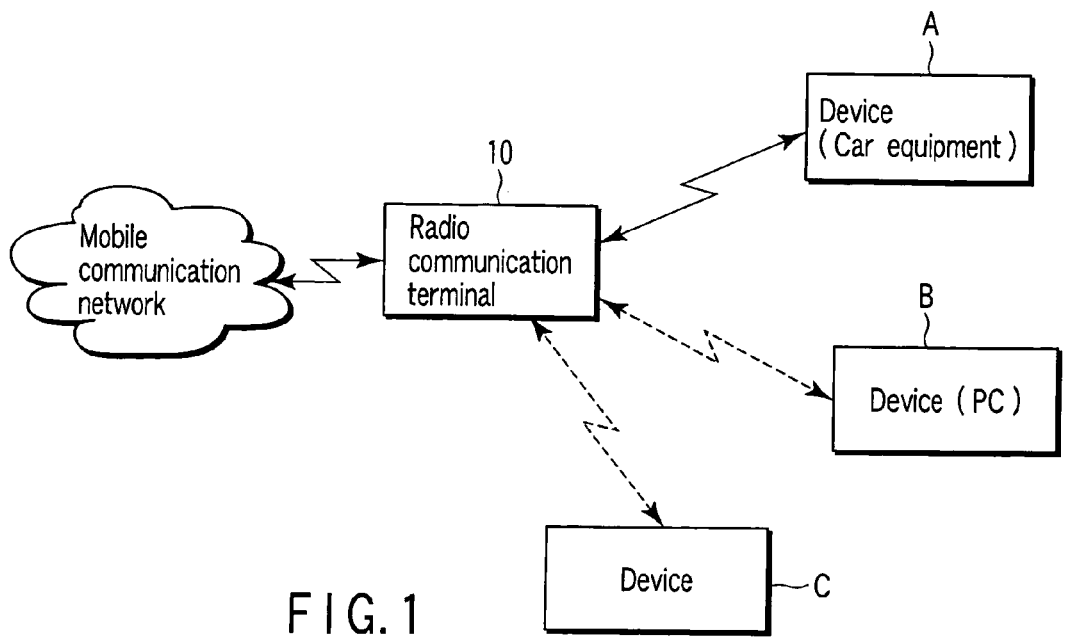
FIG. 1 is a block diagram illustrating a structure of a system in this embodiment of the present invention.

FIG. 1 is a block diagram illustrating a structure of a system in this embodiment. In FIG. 1, a radio communication terminal 10 configured as a cellular phone, for example, operates as a server terminal which provides services. Devices A, B and C which can conduct radio communications with the radio communication terminal 10 request provision of services from the radio communication terminal 10. Examples of the services which the radio communication terminal 10 provides are handsfree service, and data communication service, etc. For example, if the devices A, B and C are provided with handsfree services from the radio communication terminal 10, users who use the devices A, B and C can talk with the other party connected via a communication network by the radio communication terminal 10, by using a microphone or a speaker for telephone conversation provided on the devices.

The radio communication terminal 10 is configured as, for example, a cellular phone, and has a communication unit which performs radio communications with a base station held in the mobile communication network. Further, the radio communication terminal 10 has a communication unit for conducting short-range radio communications among the devices A, B and C according to the Bluetooth technique, for example.

Figure 2:
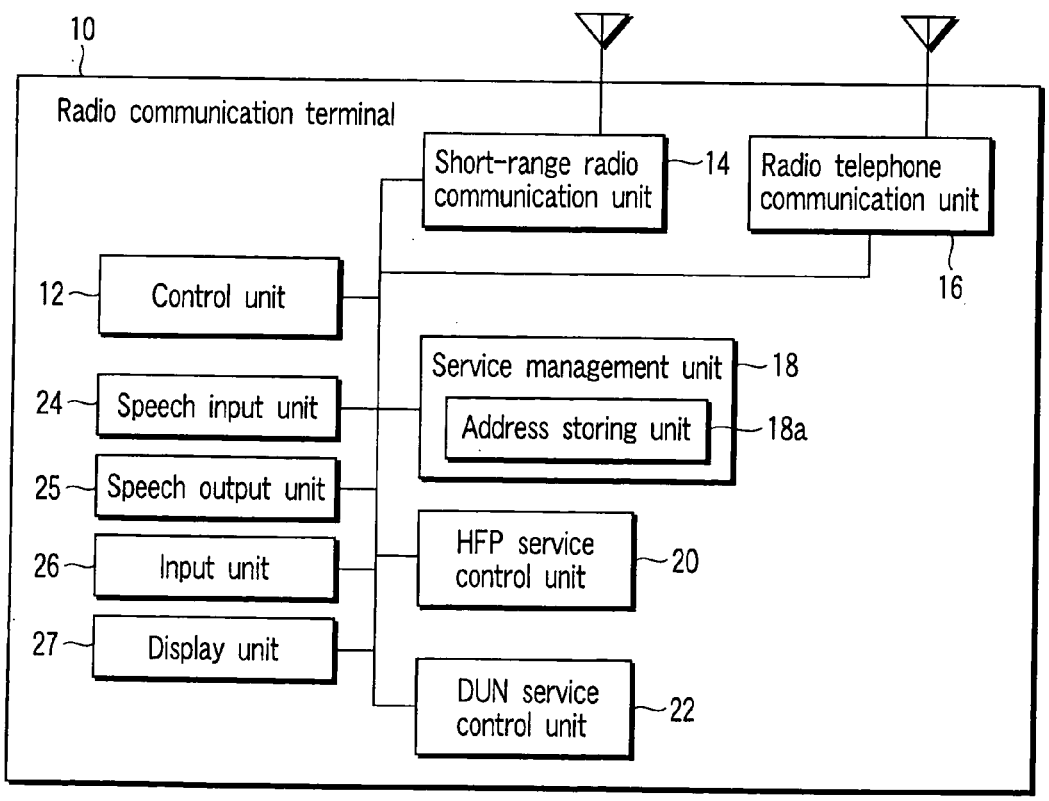
FIG. 2 is a block diagram illustrating a structure of a radio communication terminal 10 in the embodiment.

FIG. 2 is a block diagram illustrating a structure of the radio communication terminal 10 in the embodiment. As shown in FIG. 2, the radio communication terminal 10 is provided with a control unit 12, a short-range radio communication unit 14, a radio telephone communication unit 16, a service management unit 18, an HFP service control unit 20, a DUN service control unit 22, a speech input unit 24, a speech output unit 25, an input unit 26, and a display unit 27.

The control unit 12 comprises a CPU, a ROM and a RAM, etc. The CPU controls the above units according to control programs and control data stored in the ROM. Control by the control unit 12 achieves speech data communication via the mobile communication network, communications with the radio communication terminal 20, and provision of various services to the devices, etc.

The short-range radio communication unit 14 controls short-range radio communications according to, for example, the Bluetooth technique. If a link loss occurs in a communication link with a device when the terminal is providing services to the device under management by the service management unit 18, the short-range radio communication unit 14 is started in a server state, and comes into a state of waiting connection from a next device.

The radio telephone communication unit 16 carries out communications with the base station held in the mobile communication network of the mobile communication system.

The service management unit 18 controls execution of various services, such as handsfree service provided by the HFP service control unit 20, and data communication service provided by the DUN service control unit 22. The service management unit 18 holds the states of the services to be provided to the devices. If a link loss occurs in a communication link with a device to which a service is being provided, the service management unit 18 stores the device address of the device in an address storing unit 18a. Further, the service management unit 18 determines whether a connection request received by the short-range radio communication unit 14 from one of the devices is a connection request from the device which was connected to the terminal before occurrence of the link loss, by using the device address held in the address storing unit 18a. If it is the device which was connected to the terminal before occurrence of the link loss, the service management unit 18 establishes a link with the device by the short-range radio communication unit 14.

The HFP service control unit 20 controls the handsfree function of the cellular phone on the basis of predetermined "Hands Free Profile", for example. The DUN service control unit 22 controls the data communication function on the basis of predetermined "Dial-up Network Profile", for example. Besides the handsfree function and the data communication function, services may be provided to devices connected via the short-range radio communication unit 14, by using other functions. Examples of other functions are a function of transmitting/receiving an object, such as a telephone book, based on "Object Push Profile", and a function of transmitting/receiving images based on "Basic Imaging Profile".

The speech input unit 24 comprises a microphone, an amplifier, a band-pass filter, and an A/D converting circuit, etc. The speech input unit 24 generates transmission speech data from user's transmission speech inputted thereto.

The speech output unit 25 comprises an A/D converting circuit, an amplifier, and a speaker, etc. The speech output unit 25 outputs an amplified speech in accordance with received speech data.

The input unit 26 controls inputs provided from buttons and keys operated by the user.

The display unit 27 controls display on a display device.

Figure 3:
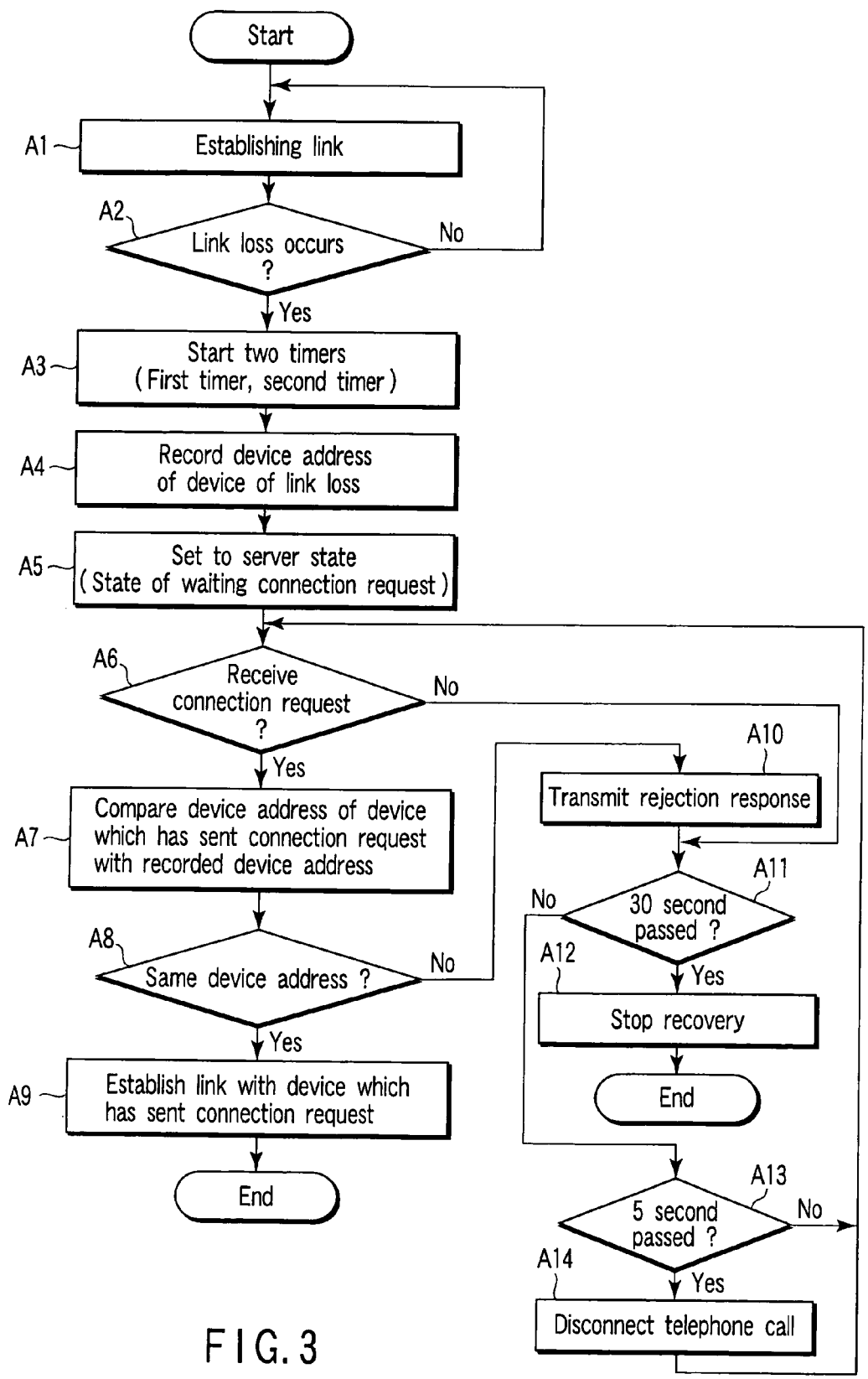
FIG. 3 is a flow chart for illustrating a link loss recovery method in the embodiment.

Next, a method of recovering a link loss in the embodiment is explained with reference to the flowchart shown in FIG. 3.

Figure 4:
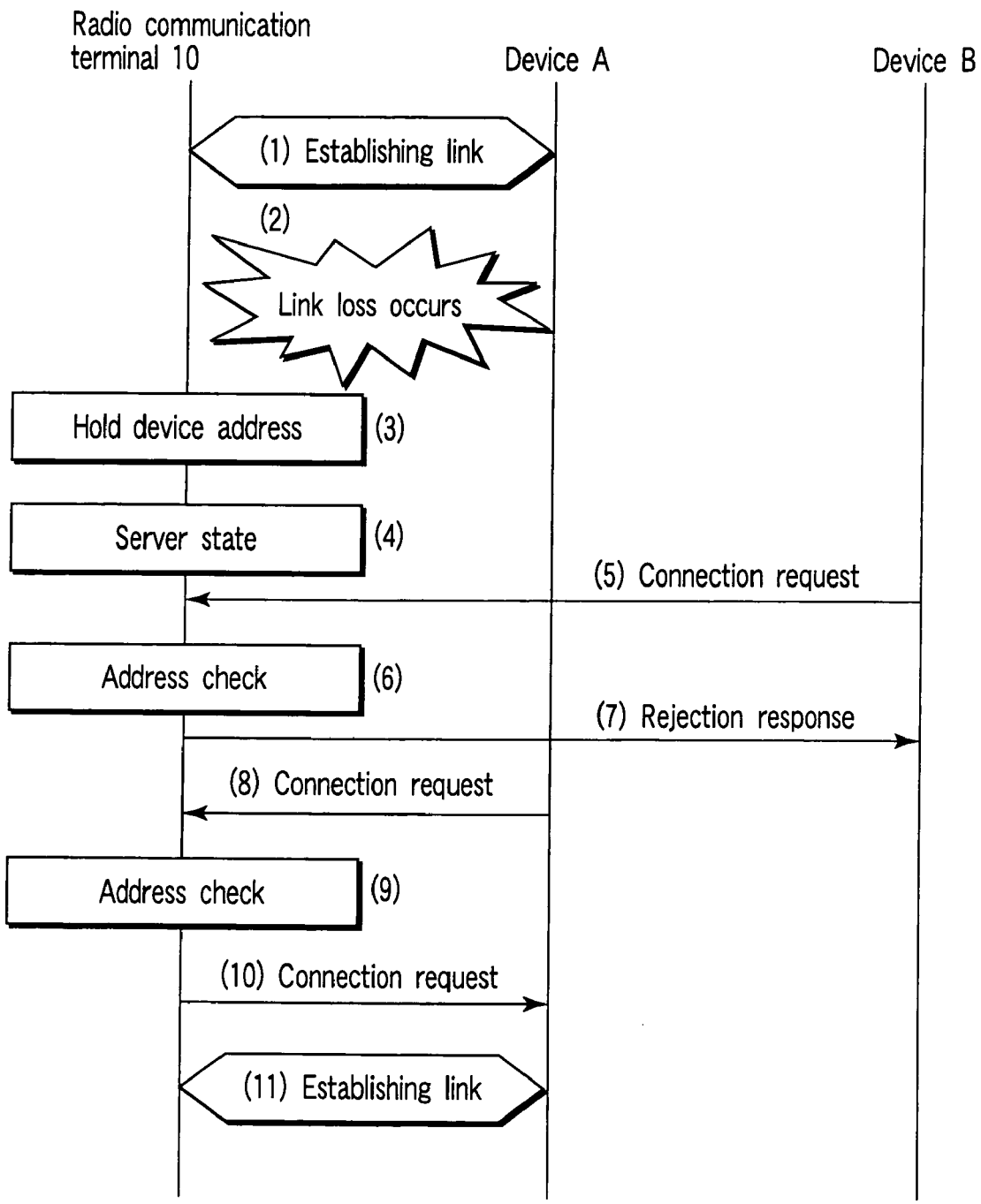
FIG. 4 is a diagram illustrating a sequence of operations of the radio communication terminal 10 and devices A and B when a link loss occurs in the embodiment.

Further, FIG. 4 is a diagram illustrating a sequence of operations of the radio communication terminal 10 and devices A and B when a link loss occurs in the embodiment.

For example, suppose that a user holding the radio communication terminal 10 rides in an automobile with the device A (car equipment). In this case, suppose that the short-range radio communication unit 14 of the radio communication terminal 10 is started in the server state, and is in the state of waiting a connection request from other devices. Further, suppose that the device A is started in a client state, and transmitting a connection request.

When the short-range radio communication unit 14 receives the connection request from the device A, the unit 14 establishes a communication link with the device A by a predetermined procedure (step A1) (FIG. 4 (1)). When the communication link with the radio communication terminal 10 (short-range radio communication unit 14) is established, the device A designates use of the handsfree service to the radio communication terminal 10.

The service management unit 18 of the radio communication terminal 10 starts the HFP service control unit 20 in response to the service designation from the device A, to start provision of the handsfree service to the device A. Specifically, the radio communication terminal 10 mediates a telephone conversation between the device A and the party to which the device A is connected via the mobile communication network by the radio telephone communication unit 16. The service management unit 18 switches a path of speech data to the device A side, to allow a telephone conversation between the device A and the party to which the device A is connected via the mobile communication network. Specifically, the unit 18 performs control such that speech data transmitted/received by the radio telephone communication unit 16 is transmitted to the device A via the short-range ratio communication unit 14.

The device A transmits speech, which has been inputted through a microphone mounted thereon, to the party of the telephone call via the radio communication terminal 10. The device A also receives speech from the party via the radio communication terminal 10, and outputs it from a speaker mounted thereon.

If the service management unit 18 detects occurrence of a link loss (abnormal disconnection) in the state where the communication link with the device A is established and when the device A is in a telephone call by using the handsfree function (step A2, Yes) (FIG. 4 (2)), the service management unit 18 starts two timers. Specifically, the service management unit 18 starts a first timer (not shown) for counting to 5 seconds, for example, from the link loss, and a second timer (not shown) for counting to 30 seconds, for example, from the link loss (step A3).

The radio communication terminal 10 is configured to disconnect the telephone call with the party via the mobile communication network by the radio telephone communication unit 16 when 5 seconds has passed from the link loss, and to stop the process of recovering the communication link through short-range radio by the short-range radio communication unit 14 when 30 seconds has passed from the link loss.

The service management unit 18 obtains a device address of the device A, with which the link was established before the link loss, from the short-range radio communication unit 14, for example, and records it in the address storing unit 18*a* (step A4) (FIG. 4 (3)).

Then, the short-range radio communication unit 14 is set to a server state, and a state of waiting a connection request from the devices (step A5) (FIG. 4 (4)).

During these steps, the first timer and the second timer count the time which has passed from the link loss (steps A11, A13). If the first timer has counted to 5 seconds (step A13, Yes), the radio telephone communication unit 16 disconnects the telephone call with the party connected via the mobile communication network (step A14).

Further, if the second timer has counted to 30 seconds (step A11, Yes), the service management unit 18 ends the processing for link loss recovery (step A12).

In the meantime, if the short-range radio communication unit 14 receives a connection request from a device, the service management unit 18 obtains a device address from the device which has sent the connection request, and compares the obtained device address with the device address recorded in the address storing unit 18*a*, that is, the device address of the device with which link was established before the link loss (step A7) (FIG. 4 (6)).

In this case, suppose that the connection request is received from the device B (such as personal computer (PC)) which was not connected with the radio communication terminal 10 just before the link loss (FIG. 4 (5)).

In this case, the compared device addresses are determined as different (step A8, No). The service management unit 18 causes the short-range radio communication unit 14 to transmit a rejection response to the device B which sent the connection request, to notify the device B of rejection of connection (step A10) (FIG. 4 (7)).

Therefore, if a link loss occurs and then the terminal becomes a state of waiting a connection request from the device to recover the link loss, the radio communication terminal 10 can reject a connection request from a device different from the device which was connected before the link loss.

In the meantime, suppose that a connection request is received from the device A (car equipment) which was connected with the radio communication terminal 10 before the link loss (FIG. 4 (8)).

In the same manner as the above, the service management unit 18 obtains a device address of the device which has sent the connection request, and compares the device address with the device address recorded in the address storing unit 18*a* (step A7) (FIG. 4 (9)).

In this case, the compared device addresses are determined as the same (step A8, Yes). The service management unit 18 causes the short-range radio communication unit 14 to transmit a connection response to the device A which has sent the connection request, to notify the device A of permission to connect with the terminal, and establishes a communication link with the device A (step A9) (FIG. 4 (10) (11)).

As described above, if a link loss occurs when a communication link is established with a device and service is being provided to the device, the radio communication terminal 10 holds the device address of the device to which the service was provided. Thereby, when the link loss is recovered, the radio communication terminal 10 can receive only a connection request from the device having the held device address.

Therefore, even if a link loss occurs in the communication link with the device A, the radio communication terminal 10 thereafter establishes a communication link with the device A again by link loss recovery, and can continuously provide the handsfree service to the device A.

In the above description, explained is the case where the radio communication terminal 10 is started as server and establishes a communication link with the device A. However, also in the case where the radio communication terminal 10 is started as client and establishes a communication link with the device A, it is possible to recover a link loss in the same manner as the above.

For example, suppose that the radio communication terminal 10 is started as client to provide a desired service, and establishes a link with the device A. If a link loss occurs in this case, the terminal holds the device address of the device A in the same manner as the above, and changes to the server state, waiting a connection request from the device for a preset time. Further, if it receives a connection request from a device and the device address of the device is the same as the device address of the device which was connected before the link loss, the terminal accepts the connection request and recovers the link loss.

Further, in the above explanation, the radio communication terminal 10 holds the device address obtained from the connected device, and determine, by using the device address, whether a device which has sent a connection request after the link loss is the device to be linked with. However, the device to be linked with may be determined on the basis of data other than the device address.

For example, suppose that the short-range radio communication between the radio communication terminal 10 and a device is established by a method according to the Bluetooth standard. In this case, a link key (private key) can be used to mutually authenticate connection between specific terminals. The link key is generated when terminals are first connected, on the basis of the same PIN (Personal Identification Number) code inputted to each of the terminals, and recorded in a device list in association with the device address of the terminal being the connection party. If a link loss occurs in a link with the device for which the link key was generated, the service management unit 18 holds the link key set for the device, and recovers the link loss by using the link key in the same manner as the above.

Further, in the above description, explained is the case where only the device A is connected to the radio communication terminal 10 and provided with the handsfree service. However, a plurality of devices may be simultaneously connected to the radio communication terminal 10, and the devices may be provided with different services, such as services by the dial-up network function (DUN), the function of transmitting/receiving an object such as a telephone book (OPP), and the function of transmitting/receiving images (BIP).

In this case, the radio communication terminal 10 holds device addresses (or link keys) of the devices in association with respective services provided to the devices. Then, the terminal 10 compares the held device address, associated with the service requested by a device, with the device address of the device which requests the service, and thereby determines whether the device is a device with which a communication link is to be established. Thereafter, the terminal 10 executes link loss recovery in the same manner as the above.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A radio apparatus comprising:
   a storage unit to store first identification information to identify that a first device corresponding to the first identification information was connected to the radio apparatus before occurrence of a link loss;
   a timer to count elapsed time from the occurrence of the link loss;
   receiving means for receiving a connection request from a second device;
   capturing means for capturing second identification information which is included in the connection request from the second device and which identifies the second device;
   comparing means for comparing the second identification information and the first identification information; and
   connection control means for: (i) if the elapsed time counted by the timer does not exceed a predetermined time period, establishing a communication link with the second device if the comparing means has judged that the first identification information agrees with the second identification information, and (ii) if the elapsed time counted by the timer does not exceed the predetermined time period, rejecting the connection request if the comparing means has judged that the first identification information does not agree with the second identification information.

2. A mobile phone connectable to a base station and a device, the mobile phone comprising:
   a storage unit to store first identification information to identify that a first device corresponding to the first identification information was connected to the mobile phone before occurrence of a link loss;
   a timer to count elapsed time from the occurrence of the link loss;
   receiving means for receiving a connection request from a second device;
   capturing means for capturing second identification information which is included in the connection request from the second device and which identifies the second device;
   comparing means for comparing the second identification information and the first identification information; and
   connection control means for: (i) if the elapsed time counted by the timer does not exceed a predetermined time period, establishing a communication link with the second device if the comparing means has judged that the first identification information agrees with the second identification information, and (ii) if the elapsed time counted by the timer does not exceed the predetermined time period, rejecting the connection request if the comparing means has judged that the first identification information does not agree with the second identification information.

3. The mobile phone according to claim 2, further comprising a first interface for communicating with the base station, and a second interface for communicating with the device directly.

4. The mobile phone according to claim 3, wherein the device to be connected via the second interface comprises car equipment.

5. A mobile phone connectable to a base station via a first interface and to a device via a second interface, the mobile phone comprising:
   a storage unit to store first identification information to identify that a first device corresponding to the first identification information was connected to the mobile phone before occurrence of a link loss;
   a timer configured to count elapsed time from the occurrence of the link loss;
   receiving means for receiving a connection request from a second device via the second interface; and
   a processor;
   wherein if the link loss is detected, the processor: (i) captures second identification information which is included in the connection request from the second device and which identifies the second device, (ii) compares the second identification information and the first identification information, (iii) establishes a communication link with the second device if the elapsed time counted by the timer does not exceed a predetermined time period and if the processor has judged that the first identification information agrees with the second identification information, and (iv) rejects the connection request if the elapsed time counted by the timer does not exceed the predetermined time period and if the processor has judged that the first identification information does not agree with the second identification information.

6. The mobile phone according to claim 5, wherein the device to be connected via the second interface comprises car equipment.

* * * * *